United States Patent [19]

Kranis, Sr.

[11] Patent Number: 4,959,986
[45] Date of Patent: Oct. 2, 1990

[54] APPARATUS FOR CUTTING A WIDE SHEET OF METAL MATERIAL INTO A PLURALITY OF NARROW STRIPS

[75] Inventor: Daniel Kranis, Sr., Wernersville, Pa.

[73] Assignee: Dana Corporation, Toledo, Ohio

[21] Appl. No.: 401,988

[22] Filed: Sep. 1, 1989

[51] Int. Cl.$^5$ .............................................. B21D 1/02
[52] U.S. Cl. ........................................ 72/129; 72/180; 72/204; 83/430
[58] Field of Search ................ 172/129, 180, 203, 204; 83/407, 430, 425.3

[56] References Cited

U.S. PATENT DOCUMENTS

| | | |
|---|---|---|
| 691,253 | 1/1902 | Fay . |
| 1,211,460 | 1/1917 | Lindquist . |
| 1,534,314 | 4/1925 | Heintz . |
| 1,608,910 | 11/1926 | Sjolander . |
| 1,729,693 | 10/1929 | Tytus . |
| 1,815,484 | 7/1931 | Schmitz . |
| 1,900,722 | 3/1933 | Manske et al. ................. 72/180 |
| 2,091,609 | 8/1937 | Owens et al. . |
| 2,294,434 | 9/1942 | Wilson . |
| 2,333,282 | 11/1943 | Wilson . |
| 2,397,029 | 3/1946 | McLaughlin et al. . |
| 2,543,392 | 2/1951 | Wessman . |
| 2,699,196 | 1/1955 | Cozzo . |
| 2,717,625 | 9/1955 | Johnson . |
| 2,796,908 | 6/1957 | Shields . |
| 2,811,989 | 11/1957 | Henderson et al. ............. 72/129 |
| 2,871,811 | 2/1959 | Gietl . |
| 3,006,401 | 10/1961 | Wognum et al. . |
| 3,344,641 | 10/1967 | Pomory . |
| 3,416,347 | 12/1968 | Walsh et al. . |
| 3,429,163 | 2/1969 | Munchbach . |
| 3,456,471 | 7/1969 | Ellis . |
| 3,535,902 | 10/1970 | Sevenich et al. . |
| 3,877,275 | 4/1975 | Attwood . |
| 3,955,389 | 5/1976 | Foster . |
| 4,067,215 | 1/1978 | Nakajima et al. . |
| 4,286,451 | 9/1981 | Chang . |
| 4,770,081 | 9/1988 | Kita . |

FOREIGN PATENT DOCUMENTS

| 617202 | 3/1961 | Canada ............................. 72/129 |
|---|---|---|
| 588039 | 1/1978 | U.S.S.R. ........................... 72/129 |

Primary Examiner—Daniel W. Howell
Attorney, Agent, or Firm—MacMillan, Sobanski & Todd

[57] ABSTRACT

A machine for cutting a relatively wide sheet of material into a plurality of relatively narrow strips to reduce bowing and camber in the cut strips is disclosed. The machine supports and moves the material along a path defined through the machine. The material initially engages a first pair of furrowing disc sets disposed on opposites sides of the sheet, which form a plurality of shallow furrows in the sheet as it passes therebetween. The material next engages a pair of slitting disc sets, also disposed on opposite sides of the sheet, which cut the relatively wide sheet into a plurality of relatively narrow strips as it passes therebetween. The slitting disc sets also engage and firmly hold the sheet near the furrows during the cutting process. Lastly, the material engages a second pair of furrowing disc sets which also engage and firmly hold the sheet near the furrows during the cutting process. Thus, each of the individual strips formed by this process have at least one furrow formed therein, which tends to minimize the occurrence of bowing and camber in the strips.

12 Claims, 4 Drawing Sheets

APPARATUS FOR CUTTING A WIDE SHEET OF METAL MATERIAL INTO A PLURALITY OF NARROW STRIPS

BACKGROUND OF THE INVENTION

This invention relates in general to slitting machines for cutting a relatively wide sheet of material, such as steel, into a plurality of relatively narrow strips. In particular, this invention relates to such a machine which forms at least one relatively shallow furrow in each of the strips to minimize bowing and camber therein after the cutting operation.

Metal materials, such as steel, are often supplied in sheet form for use in manufacturing operations. The thickness of such sheets may vary from several thousandths of an inch to one quarter of an inch or more. For greater convenience and efficiency, sheets of metal are usually supplied in coiled form, wherein the sheet is rolled up lengthwise upon itself in spiral fashion. Often, these coils are supplied in standard widths which are wider than required for the intended manufacturing operations. For example, a coil of steel may be supplied having a width of about six feet, but the manufacturing operations may be intended to handle material which is only about one foot wide. In these instances, the relatively wide sheets must be cut in narrower strips which are usable in these manufacturing operations.

To accomplish this, machines have been provided in the past for cutting the wide sheet of material into a plurality of relatively narrow strips. Such machines usually include some means for supporting the coil thereon and for unrolling the coil at a desired rate. As the coil is unwound, the leading edge of the material is engaged by feed rollers and moved along a path through the machine. A plurality of rotatable slitting discs are provided on the machine for cutting the wide sheet of material into a plurality of narrow strips. The slitting discs are usually supported for rotation about a common axis extending perpendicular to the direction of movement of the sheet. As the material is moved through the machine, the slitting discs cut the wide sheet into the plurality of narrow strips. Then, the cut strips are rewound into individual coils for subsequent use in the manufacturing operations.

Unfortunately, it has been found that the strips of material which are cut from a sheet in this fashion often become bowed after the slitting process. Bowing occurs when the length of the strip is not flat, curving upwardly or downwardly from end to end when viewed from the side. For example, a twenty foot long strip of one quarter inch thick steel has been found to bow up to six inches from end to end after being cut from the sheet. In other words, if one end of such a strip was held down against a flat surface, the other end of the strip would curve upwardly six inches above the surface.

Cut strips of material have also been found to experience camber after the slitting process. Camber occurs when the sides of the strip are non-linear when viewed from above, even when the strip lies flat on a surface (i.e., not bowed). In other words, the sides of the strip arc concentrically from end to end like a flat curved road. When camber occurs, the longitudinal center of the strip at the midpoint thereof is not located on a line connecting the longitudinal centers of the strip at the ends thereof. For example, if a line is drawn between the two longitudinal centers at the ends of a twenty foot long strip of one quarter inch thick steel, the longitudinal center of the strip at its midpoint has been found to be located up to one inch away from the line.

It is believed that bowing and camber are caused by residual stresses created within the sheet of material during its formation. Such formation generally involves hot-mill rolling of the material, followed by water cooling. During the water cooling process, the outer surfaces of the sheet are cooled much faster than the interior regions thereof. This uneven cooling is believed to generate these residual stresses. Although such residual stresses are generally not large enough to adversely affect the overall shape of the uncut sheet of material, they apparently are sufficient to cause bowing and camber when the sheet is cut into relatively narrow strips. In any event, when bowing and camber occur in the magnitudes discussed above, the strip is usually rendered unusable for the intended manufacturing operations. Accordingly, it would be desirable to provide an apparatus for cutting narrow strips of material from a wide sheet which reduces or prevents the occurrence of bowing and camber.

SUMMARY OF THE INVENTION

This invention relates to a machine for cutting a relatively wide sheet of material, such as steel, into a plurality of relatively narrow strips in such a manner as to reduce bowing and camber in the cut strips. The machine includes means for supporting and moving the material along a path defined through the machine. The material initially engages a first pair of furrowing disc sets disposed on opposites sides of the sheet. The first pair of furrowing disc sets form a plurality of relatively shallow furrows in the sheet as it passes therebetween. The material next engages a pair of slitting disc sets, also disposed on opposite sides of the sheet. The slitting disc sets cut the relatively wide sheet into a plurality of relatively narrow strips as it passes therebetween. The slitting disc sets also engage and firmly hold the sheet near the furrows during the cutting process. Lastly, the material engages a second pair of furrowing disc sets disposed on opposites sides of the sheet. The second pair of furrowing disc sets also engage and firmly hold the sheet near the furrows during the cutting process. Thus, each of the individual strips formed by this process has at least one furrow formed therein. The formation of the furrows tends to minimize the occurrence of bowing and camber in the strips.

It is an object of this invention to provide an apparatus for cutting a relatively wide sheet of metal material into a plurality of relatively narrow strips.

It is another object of this invention to provide such an apparatus which forms at least one furrow in each of the strips so as to reduce bowing and camber therein Other objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
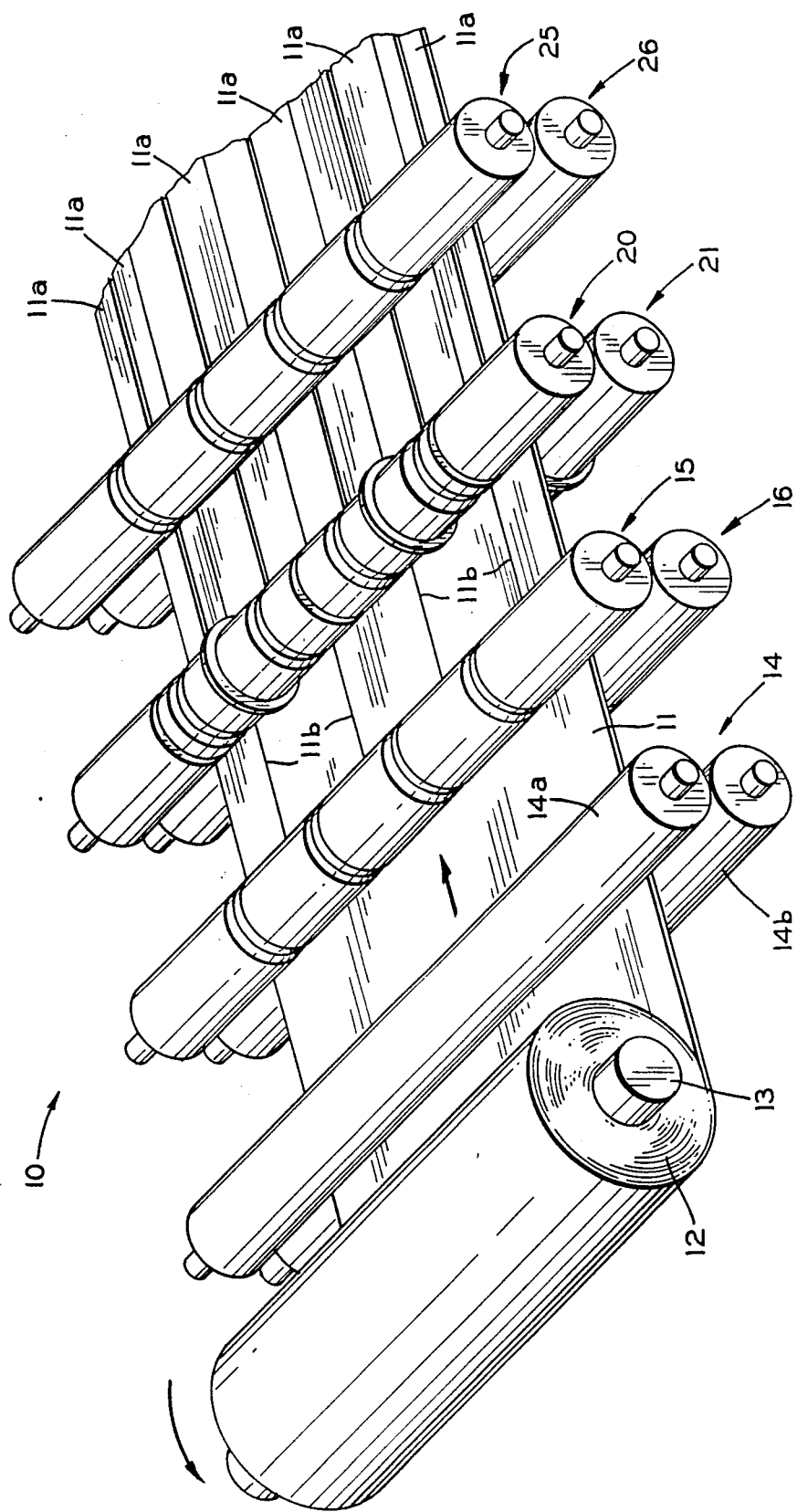
FIG. 1 is a schematic perspective view illustrating a slitting machine for cutting relatively narrow strips from a relatively wide sheet of metal material in accordance with this invention.
Figure 2:
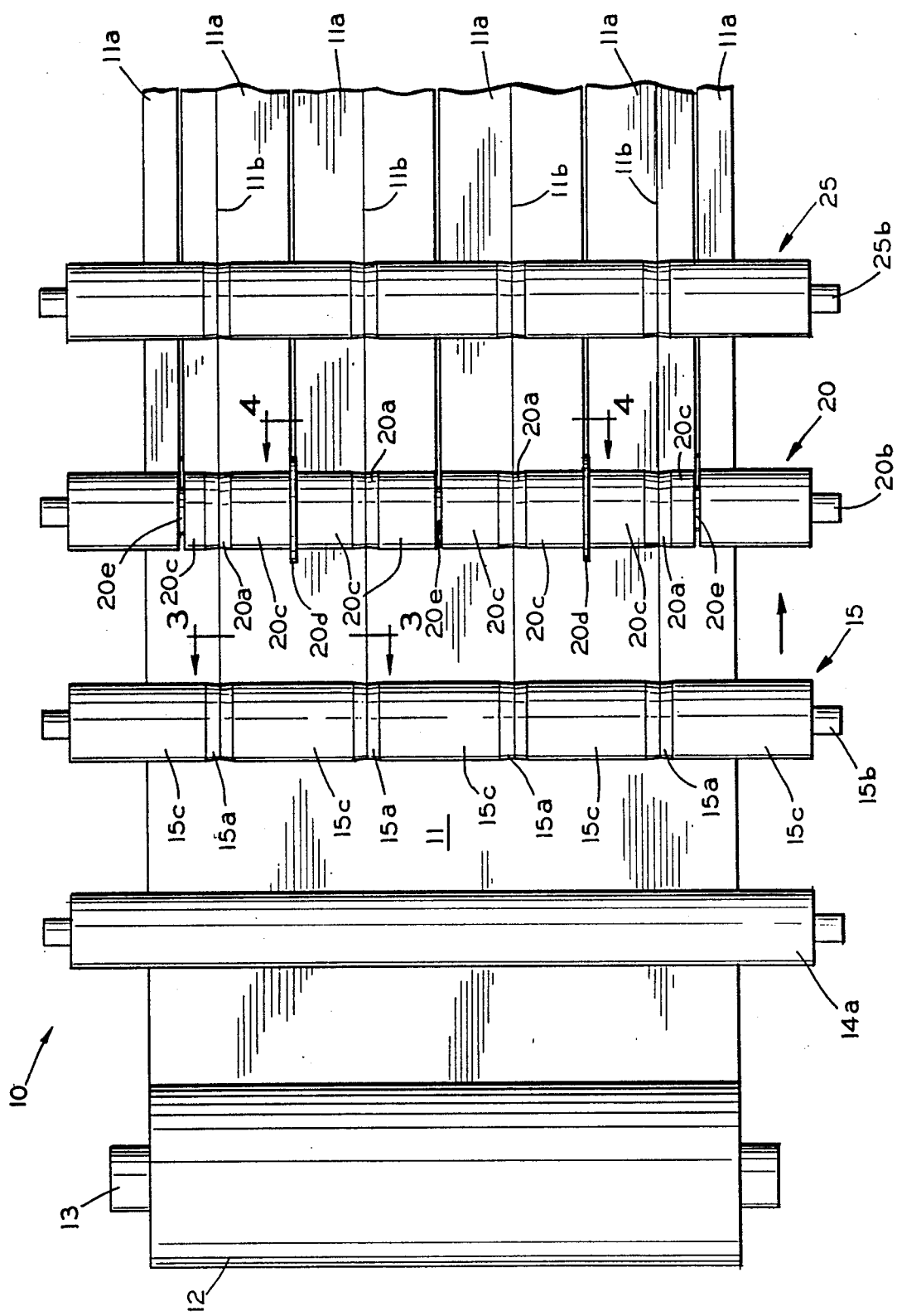
FIG. 2 is a top plan view of the machine shown in FIG. 1.

Referring now to the drawings, there is schematically illustrated in FIGS. 1 and 2 a slitting machine, indicated generally at 10, in accordance with this invention. The machine 10 is adapted to support a flat sheet 11 of metal material and to move the sheet 11 through a path defined in the machine 10. Additionally, the machine 10 is adapted to cut the sheet 11 into a plurality of long relatively narrow strips 11a as it is moved therethrough. Throughout this process, the machine 10 creates shallow furrows or longitudinal indentations 11b in the sheet 11 and the strips 11a. As will be explained in detail below, these furrows 11b minimize the occurrence of bowing and camber resulting from residual stresses present in the sheet 11 of material.

The sheet 11 may be supplied to the slitting machine 10 in the form of a coil, indicated generally at 12, wherein the length of the sheet 11 is rolled up in spiral fashion. The coil 12 is supported by a cylindrical mandrel 13 connected to the machine 10. The mandrel 13 is rotated by any conventional means in the direction indicated by the curved arrow in FIG. 1 to feed the leading edge of the sheet 11 to a conventional feed roller means, schematically illustrated at 14. The feed roller means 14 includes an upper feed roller 14a and a lower feed roller 14b disposed in the path of the sheet 11 on opposite sides thereof. The upper and lower feed rollers 14a and 14b are rotatably driven by any conventional means so as to frictionally engage the sheet 11 therebetween and advance the sheet 11 through the machine 10 in a known manner. The engagement of the sheet 11 by the feed roller means 14 tends to straighten any curvature created in the sheet 11 as a result of being wound up into the coil 12. Consequently, as the coil 12 is unwound, the generally flat sheet 11 is fed linearly through the machine 10 in the direction indicated by the straight arrows in FIGS. 1 and 2.

The leading edge of the sheet 11 next engages a first pair of furrowing disc sets, indicated generally at 15 and 16. The upper and lower furrowing disc sets 15 and 16 are disposed in the path of the sheet 11 on opposite sides thereof. The structures of the upper and lower furrowing disc sets 15 and 16 are illustrated more clearly in FIG. 3. As shown therein, the upper furrowing disc set 15 includes a plurality of upper furrowing discs 15a which are mounted on a shaft 15b. Each of the upper furrowing discs 15a tapers slightly inwardly from each end toward the shaft 15b to form a concave region. The upper furrowing discs 15a are spaced apart from one another by cylindrical spacer tubes 15c, also mounted on the shaft 15b. The ends of the shaft 15b are supported on the machine 10 by any conventional means (not shown) for free rotational movement about its axis.

Similarly, the lower furrowing disc set 16 includes a plurality of lower furrowing discs 16a which are mounted on a shaft 16b. Each of the lower furrowing discs 16a tapers slightly outwardly from each end away from the shaft 16b to form a convex region. The lower furrowing discs 16a are spaced apart from one another by spacer tubes 16c, also mounted on the shaft 16b. The ends of the shaft 16b are also supported on the machine 10 by conventional means for free rotational movement about its axis. As best shown in FIG. 2, the axes of rotation defined by the shafts 15b and 16b are perpendicular to the direction of movement of the sheet 11 through the machine 10.

Figure 3:
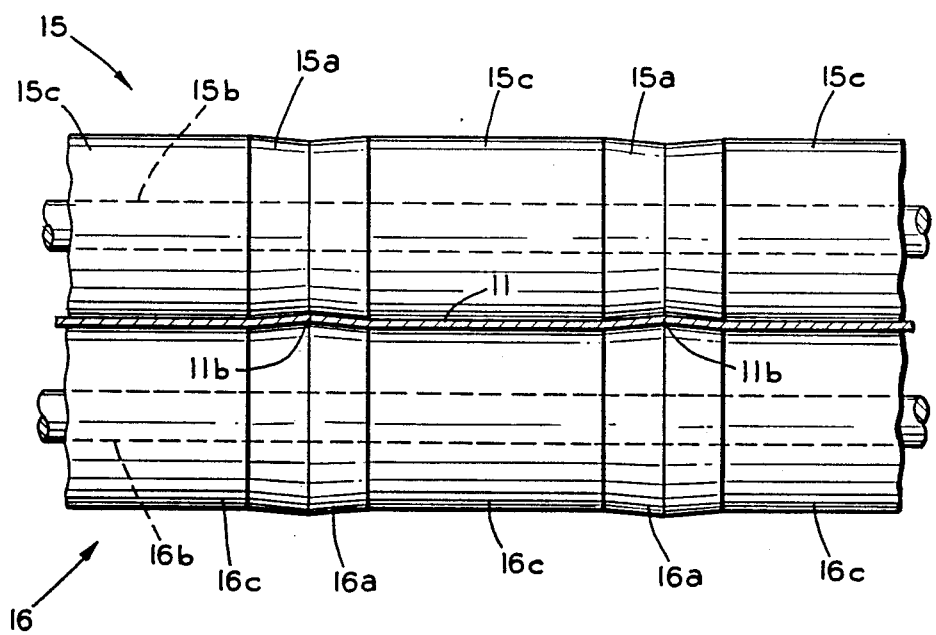
FIG. 3 is a cross-sectional view taken along line 3—3 of FIG. 2.

The upper and lower furrowing discs 15a and 16a are shaped in complementary fashion, as shown in FIG. 3, such that the convex regions of the lower furrowing discs 16a respectively extend into the concave regions of the upper furrowing discs 15a. The spacer tubes 15c and 16c are selected to position the furrowing discs 15a and 16a in this adjacent cooperating manner. Although the furrowing discs 15a and 16a are shown in FIGS. 1 through 3 as being spaced equidistantly along the shafts 15b and 16b, it will be appreciated that such furrowing discs 15a and 16a may be spaced as desired by using spacer tubes 15c and 16c of differing length, as will be seen below.

Having passed through the first pair of furrowing disc sets 15 and 16, the leading edge of the sheet 11 next passes between and is engaged by a pair of slitting disc sets, indicated generally at 20 and 21, disposed on opposite sides of the sheet 11. The structures of the upper and lower slitting disc sets 20 and 21 are illustrated more clearly in FIG. 4. As shown therein, the upper slitting disc set 20 includes a plurality of upper furrowing discs 20a which are mounted on a shaft 20b. The upper furrowing discs 20a are sized and shaped similar to the upper furrowing discs 15a previously discussed. Furthermore, the upper furrowing discs 20a are longitudinally aligned (i.e., aligned in a direction which is parallel with the path of movement of the sheet 11) with the upper furrowing discs 15a such that the furrows 11b pass therethrough, for reasons which will be discussed below. The ends of the shaft 20b are supported on the machine 10 by any conventional means (not shown) for free rotational movement about its axis.

The upper furrowing discs 20a are spaced apart from one another by spacer tubes 20c, also mounted on the shaft 20b. However, the spacer tubes 20c are somewhat shorter in length than the spacer tubes 15c, and two of such spacer tubes 20c are provided between each of the furrowing discs 20a. An enlarged diameter slitting disc 20d is mounted on the shaft 20b between some of the adjacent spacer tubes 20c, while a reduced diameter slitting spacer 20e is mounted on the shaft 20b between the other adjacent spacer tubes 20c. As shown in the drawings, the slitting discs 20d and the slitting spacers 20e are provided in alternating fashion along the upper slitting disc set 20.

Similarly, the lower slitting disc set 21 includes a plurality of lower furrowing discs 21a which are mounted on a shaft 21b. The lower furrowing discs 21a are sized and shaped similar to the lower furrowing discs 16a previously discussed. Furthermore, the lower furrowing discs 21a are longitudinally aligned with the lower furrowing discs 16a such that the furrows 11b pass therethrough. The ends of the shaft 21b are supported on the machine 10 by any conventional means (not shown) for free rotational movement about its axis. The lower furrowing discs 21a are spaced apart from one another by spacer tubes 21c, also mounted on the shaft 21b, similar to the shorter spacer tubes 20c provided on the upper slitting disc set 20.

Figure 4:
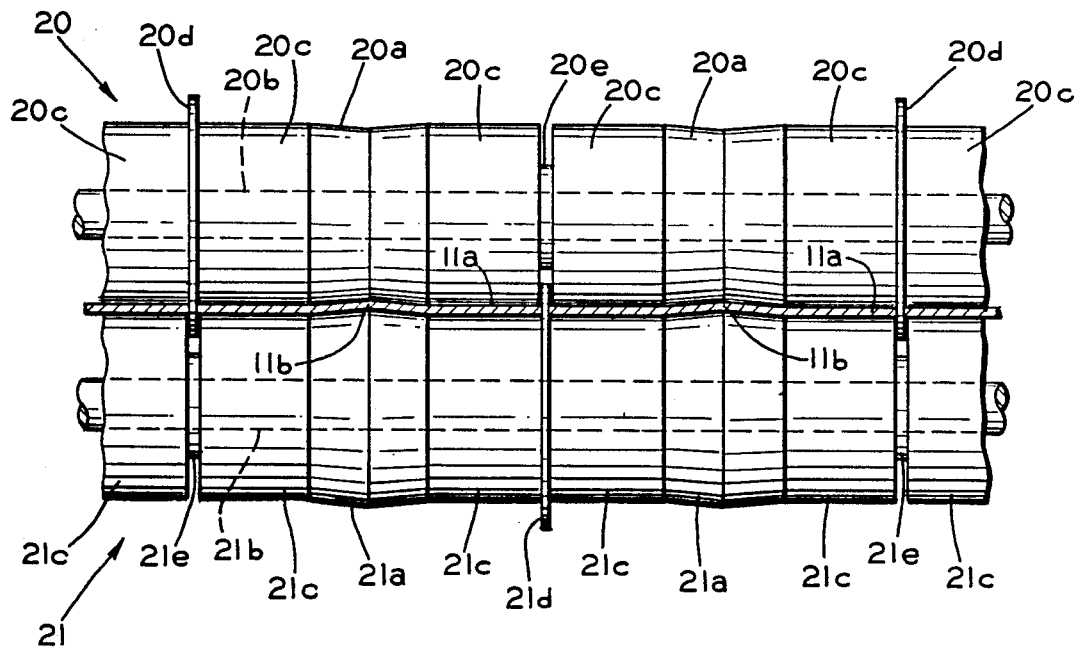
FIG. 4 is a cross-sectional view taken along line 4—4 of FIG. 2.

Enlarged diameter slitting discs 21d and reduced diameter slitting spacers 21e are also mounted on the shaft 21b as described above. As best shown in FIG. 4, the upper slitting discs 20d are aligned with the lower slitting spacers 21e, while the lower slitting discs 21d are aligned with the upper slitting spacers 20e. The upper slitting discs 20d are sized such that they extend into the spaces defined between the adjacent lower spacer tubes 21c created by the lower slitting spacers 21e. Similarly, the lower slitting discs 21d are sized such that they extend into the spaces defined between the adjacent upper spacer tubes 20c created by the upper slitting spacers 20e. When the leading edge of the sheet 11 is fed through the slitting disc sets 20 and 21, the slitting discs 20d and 21d pierce through the sheet 11 so as to form the plurality of strips 11a. While this slitting of the sheet 11 occurs, the upper and lower furrowing discs 20a and 21a engage the sheet 11 firmly along the furrows 11b previously formed therein. Consequently, the sheet 11 is firmly held during the slitting operation.

Having passed through the slitting disc sets 20 and 21, the leading edges of the strips 11a next engage a second pair of furrowing disc sets, indicated generally at 25 and 26, disposed in the path thereof on opposite sides. The structures of the second furrowing disc sets 25 and 26 are identical to that of the first furrowing disc sets 15 and 16 discussed above. Therefore, second furrowing disc sets 25 and 26 include upper and lower furrowing discs which are longitudinally aligned with the upper and lower furrowing discs provided on the first furrowing disc sets 15 and 16. The second furrowing disc sets 25 and 26 are provided to engage the strips 11a, similar to the furrowing discs 20a and 21a provided on the slitting disc sets 20 and 21. Not only does such engagement firmly hold the strips 11a during the slitting operation, but it tends to further straighten the strips as they pass through the machine 10.

In operation, an uncut sheet 11 of material wound into a coil 13 having a relatively wide width is initially mounted on the mandrel 13. The mandrel 13 is then rotated so as to feed the leading edge of the sheet 11 into the feed roller means 14. The feed roller means 14 advances the sheet 11 through the remainder of the machine 10. When the leading edge of the sheet 11 engages the first pair of furrowing disc sets 15 and 16, the upper and lower furrowing discs 15a and 16a slightly deform the sheet 11 so as to create the plurality of shallow furrows 11b therein.

The size and shape of such furrows 11b can be varied as desired, but they may be relatively small in comparison to the size of the sheet 11. For example, when the sheet 11 is formed from steel having a thickness of approximately one quarter of an inch, the furrows 11b may be formed having a depth of only one sixty-fourth of an inch using six inch wide furrowing discs 15a and 16a. Furrows 11b of this size have been found to induce sufficient stresses within the sheet 11 to counteract the residual stresses therein to minimize bowing and camber when the sheet 11 is cut into strips 11a, as previously discussed.

The furrowed sheet 11 next passes between the slitting disc sets 20 and 21. As mentioned above, the slitting disc sets 20 and 21 include respective furrowing discs 20a and 21a which firmly hold the sheet 11 in the region of the furrows 11b during the slitting operation, as do the furrowing discs of the second pair of furrowing disc sets 25 and 26. Consequently, the sheet 11 and the strips 11a are constantly engaged by the machine 10 throughout the cutting process. Additionally, the sheet 11 and the strips 11a are further straightened by this continuous engagement. As a result, the strips 11a which emerge from the machine 10 do not experience bowing and camber to a significant degree.

Figure 5:
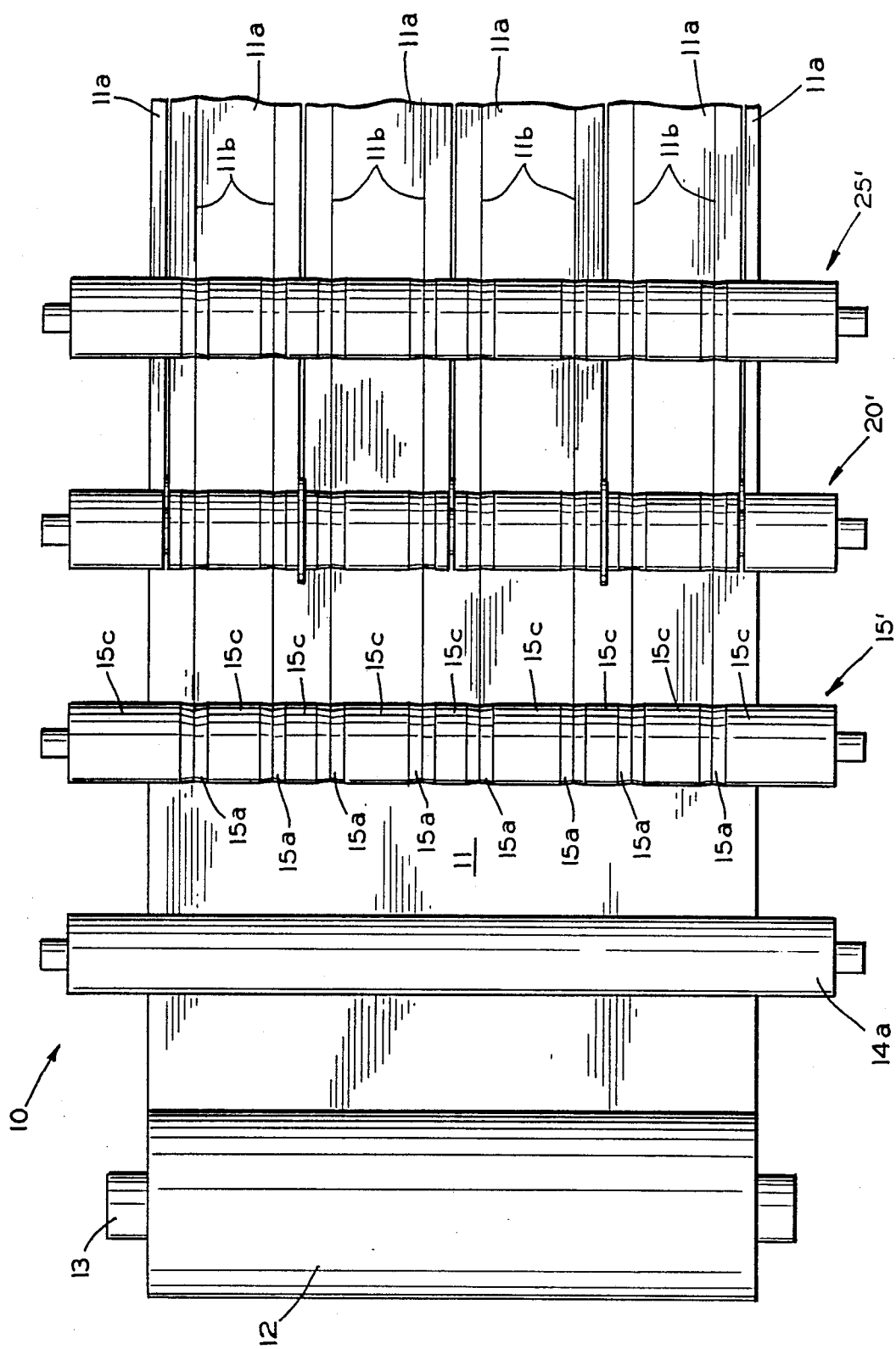
FIG. 5 is a schematic top plan view illustrating an alternate embodiment of the slitting machine shown in FIG. 1.

It will be appreciated that the machine 10 thus far described creates one furrow 11b in each of the strips 11a. FIG. 5 illustrates an alternative embodiment of the machine 10' wherein a plurality of furrows 11b are created in each of the strips 11a. As shown therein, the first furrowing disc sets 15' and 16' include additional pairs of furrowing discs 15a and 16a than as shown in FIG. 2. Similarly, the slitting disc sets 20' and 21' and the second pair of furrowing disc sets 25' and 26' also include additional pairs of furrowing discs. These additional furrowing discs operate in the same manner as described above to form a plurality of furrows 11b in each of the strips 11a. The extra furrows 11b may be desirable if the sheet 11 experiences severe bowing or camber after slitting.

Alternatively, the extra furrows 11b may be provided to coincide with predetermined longitudinally extending bending lines on each of the strips 11a. For example, as shown in FIG. 5, two furrows 11b are formed in each of the strips 11a. After being cut from the sheet 11, the longitudinal edges of each strip 11a may be bent upwardly along such furrows 11b so as to extend perpendicular to the central portion of the strip 11. As a result, a member having a generally C-shaped cross section is formed. Thus, while the furrows 11b serve their purpose of preventing bowing and camber before such bending, they are effectively removed or concealed in the final product.

In accordance with the provisions of the patent statutes, the principle and mode of operation of the invention have been described and illustrated in its preferred embodiment. However, it must be understood that this invention may be practiced otherwise than as specifically explained and illustrated without departing from its scope or spirit.

What is claimed is:

1. An apparatus for cutting a relatively narrow strip from a relatively wide sheet of material having internal stresses comprising:
   means for moving the sheet of material along a path;
   slitting disc means disposed in said path for cutting the strip from the sheet of material and;
   furrowing disc means disposed in said path for forming a relatively shallow furrow in the strip to relieve the internal stresses present therein such that the strip is substantially flat after being cut from the sheet.

2. The invention defined in claim 1 wherein said furrowing disc means includes upper and lower furrowing disc sets located on opposite sides of the sheet.

3. The invention defined in claim 2 wherein said upper furrowing disc set includes an upper furrowing disc having an inwardly tapered region and said lower furrowing disc set includes a lower furrowing disc having an outwardly tapered region, said inwardly and outwardly tapered regions cooperating with one another to form said furrow.

4. The invention defined in claim 3 wherein said slitting disc means includes upper and lower slitting disc sets located on opposite sides of the sheet.

5. The invention defined in claim 4 wherein said upper slitting disc set includes a slitting disc and said lower slitting disc set includes a slitting spacer, said slitting disc extending into a space defined by said slitting spacer to cut the strip from the sheet of material, said upper and lower furrowing discs being positioned relative to said slitting disc and said slitting spacer to form said furrow in the strip.

6. The invention defined in claim 2 wherein said upper furrowing disc set includes a plurality of upper furrowing discs, each having an inwardly tapered region, and said lower furrowing disc set includes a plurality of lower furrowing discs, each having an outwardly tapered region, said inwardly and outwardly tapered regions cooperating with one another to form a plurality of said furrows.

7. The invention defined in claim 6 wherein said slitting disc means includes upper and lower slitting disc sets located on opposite sides of the sheet.

8. The invention defined in claim 7 wherein said upper slitting disc set includes a plurality of slitting discs and said lower slitting disc set includes a plurality of slitting spacers, said slitting disc extending into respective spaces defined by said slitting spacers to cut a plurality of strips from the sheet of material, said upper and lower furrowing discs being positioned relative to said slitting discs and said slitting spacers to form at least one of said furrows in each of the strips.

9. The invention defined in claim 8 wherein said upper slitting disc set further includes a plurality of slitting spacers disposed in alternating fashion with said slitting discs along said upper slitting disc set, and wherein said lower slitting disc set further includes a plurality of slitting discs disposed in alternating fashion with said slitting spacers along said lower slitting disc set.

10. The invention defined in claim 1 wherein said furrowing disc means is located in said path ahead of said said slitting disc means so as to form said furrow in said material before said slitting disc means cuts the strip containing said furrow therefrom.

11. The invention defined in claim 1 wherein said furrowing disc means is located in said path after said said slitting disc means so as to form said furrow in said material after said slitting disc means cuts the strip containing said furrow therefrom.

12. The invention defined in claim 1 wherein said furrowing disc means is located at the same location in said path as said said slitting disc means so as to simultaneously form said furrow in said material while said slitting disc means cuts the strip containing said furrow therefrom.

* * * * *